United States Patent
Audenaert et al.

(10) Patent No.: US 12,091,573 B2
(45) Date of Patent: Sep. 17, 2024

(54) POLYSILOXANE-BASED PROTECTIVE COATING COMPOSITION FOR HARD SURFACES

(71) Applicant: 3M INNOVATIVE PROPERTIES COMPANY, St. Paul, MN (US)

(72) Inventors: Frans A. Audenaert, Kaprijke (BE); Christoph T. R. Schuell, Neuss (DE); Bernd Kühneweg, Duesseldorf (DE); Hugo R. Lens, Boechout (BE); Philip A. Jinks; Wayne W. Fan, Cottage Grove, MN (US); Inge Nuyts, Steendorp (BE)

(73) Assignee: 3M Innovative Properties Company, St. Paul, MN (US)

( * ) Notice: Subject to any disclaimer, the term of this patent is extended or adjusted under 35 U.S.C. 154(b) by 847 days.

(21) Appl. No.: 15/733,678

(22) PCT Filed: May 31, 2019

(86) PCT No.: PCT/IB2019/054528
§ 371 (c)(1),
(2) Date: Sep. 28, 2020

(87) PCT Pub. No.: WO2019/234566
PCT Pub. Date: Dec. 12, 2019

(65) Prior Publication Data
US 2021/0079257 A1    Mar. 18, 2021

(30) Foreign Application Priority Data

Jun. 8, 2018 (EP) ..................... 18176711

(51) Int. Cl.
*C09D 183/04* (2006.01)
*C08G 77/388* (2006.01)
(Continued)

(52) U.S. Cl.
CPC ......... *C09D 183/04* (2013.01); *C08G 77/388* (2013.01); *C08G 77/392* (2013.01);
(Continued)

(58) Field of Classification Search
CPC .......... C09D 183/04; C09D 7/20; C09D 7/63; C08G 77/388; C08K 5/544
(Continued)

(56) References Cited

U.S. PATENT DOCUMENTS 7,928,179 B2   4/2011   Yoshikawa
2005/0163933 A1   7/2005   Dietsche
(Continued)

FOREIGN PATENT DOCUMENTS

EP    1300433    10/2008
EP    1389634    10/2012
(Continued)

OTHER PUBLICATIONS

Extended EP Search Report for EP Application No. 18176711.2, mailed on Dec. 17, 2018, 7 pages.
(Continued)

*Primary Examiner* — Colin W. Slifka
(74) *Attorney, Agent, or Firm* — Julie Lapos-Kuchar; Jean A. Lown

(57) ABSTRACT

The present disclosure relates to a protective coating composition for a hard surface, wherein the composition comprises an organic solvent and a polysiloxane having the general formula (I), wherein: $R^1$, $R^2$, $R^3$, $R^4$, $R^5$, $R^6$, $R^7$ and $R^8$ are independently an alkyl group having from 1 to 8 carbon atoms; Y and Z are independently a divalent linking group selected from the group consisting of urea, urethane, oxygen atom, sulfur atom and alkylene having from 1 to 8 carbon atoms; A, B, L and M are independently a divalent slinking group selected from the group consisting of
(Continued)

alkylene having from 1 to 8 carbon atoms, with the proviso that if the combined linking groups formed by -A-Y-L- and -M-Z—B— are independently an alkylene, then the alkylene is independently different from ethylene; n is an integer from 5 to 1500; and m and p are independently an integer from 1 to 3. In another aspect, the present disclosure is directed to a method of reducing contamination from a hard surface.

14 Claims, 1 Drawing Sheet

(51) Int. Cl.
- *C08G 77/392* (2006.01)
- *C08K 5/544* (2006.01)
- *C09D 7/20* (2018.01)
- *C09D 7/63* (2018.01)

(52) U.S. Cl.
CPC ................ *C08K 5/544* (2013.01); *C09D 7/20* (2018.01); *C09D 7/63* (2018.01)

(58) Field of Classification Search
USPC ..................................................... 106/287.23
See application file for complete search history.

(56) References Cited

U.S. PATENT DOCUMENTS

| | | |
|---|---|---|
| 2007/0240792 A1 | 10/2007 | Witteler |
| 2007/0244250 A1 | 10/2007 | Yoshikawa |
| 2008/0314287 A1 | 12/2008 | Clark |
| 2012/0053104 A1 | 3/2012 | Olson |
| 2013/0101841 A1* | 4/2013 | Yang .................. C09D 183/04 524/588 |

FOREIGN PATENT DOCUMENTS

| | | |
|---|---|---|
| EP | 3205399 | 8/2017 |
| EP | 3263665 | 5/2019 |
| WO | WO 2005-100520 | 10/2005 |
| WO | WO 2005-100521 | 10/2005 |
| WO | WO 2007-077136 | 7/2007 |
| WO | WO 2012-078469 | 6/2012 |
| WO | WO 2012-146023 | 11/2012 |
| WO | WO 2015-026652 | 2/2015 |
| WO | WO 2015-048824 | 4/2015 |
| WO | WO 2015-142894 | 9/2015 |
| WO | WO 2017-053345 | 3/2017 |
| WO | WO 2018-005317 | 1/2018 |

OTHER PUBLICATIONS

International Search Report for PCT International Application No. PCT/IB2019/054528, mailed on Oct. 1, 2019, 4 pages.

* cited by examiner

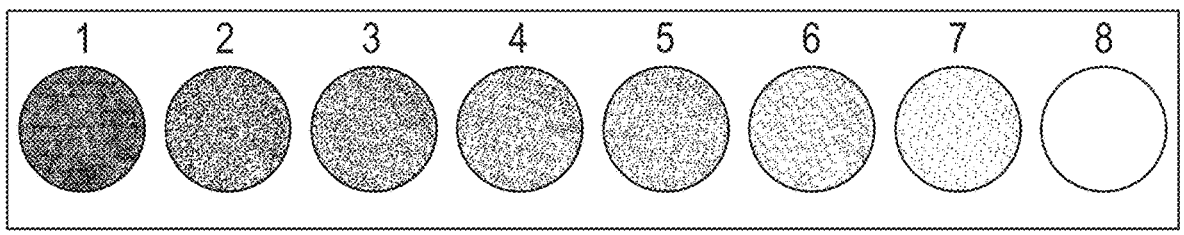

POLYSILOXANE-BASED PROTECTIVE COATING COMPOSITION FOR HARD SURFACES

CROSS REFERENCE TO RELATED APPLICATIONS

This application is a national stage filing under 35 U.S.C. 371 of PCT/IB2019/054528, filed May 31, 2019, which claims the benefit of European Application No. 18176711.2, filed Jun. 8, 2018, the disclosure of which is incorporated by reference in its/their entirety herein.

TECHNICAL FIELD

The present disclosure relates to the field of protective and functional coatings which are useful for protecting hard surfaces. The present disclosure also relates to a method of treating a hard surface.

BACKGROUND

Substrates and materials such as siliceous and metallic substrates, in particular iron, steel, aluminum, zinc and glass substrates are widely used in the fields of transportation, aeronautics and astronautics, energy, electronics, architecture, upholstery and household electrical appliances, just to name a few. In particular, stainless steel and glass substrates are ubiquitous in commercial kitchens, home kitchens, office buildings, airports, and various other public spaces. Most metals are susceptible to corrosion when exposed to humid air and corrosive liquids. Such corrosion may severely affect the quality of the metals and the products made of the metals. Accordingly, various methods for the passivation of metal surfaces to provide corrosion protection properties to such materials have been developed. Exemplary methods for providing corrosion protection to metallic surfaces are described e.g. in US 2005/0163933A1 (Dietsche et al.), US 2007/0240792A1 (Witteler et al.), in WO 2015026652 (Yin et al.) and in US 2012/0053104A1 (Olson et al.). The disclosed methods typically make use of coating compositions comprising a water-soluble polymer, such as e.g. a polyacrylate. Other surface treating agents using fluorinated compounds are described e.g. in EP-A1-1389634 (Satoh et al.) and in EP-A2-1300433 (Yamaguchi et al.).

In contrast, protective coating compositions for alternative metallic surfaces such as those comprising essentially chromium are not widely described in the art. Chromium-containing metallic surfaces may though be encountered in a large variety of articles including those present in home or commercial kitchens, in decorative household appliances, in restrooms, in bathrooms, in automotive vehicles, or in consumer electronics.

Stainless steel, and in particular chromium surfaces, are particularly sensitive to oily contaminants such as fingerprints, stains or marks originating from oily of fat components. Fingerprints or other oily contamination present on metal surfaces not only detrimentally affect their aesthetic appearance, but may also attract additional dirt such as lint or dust. The ability to remove or clean oily contamination from chromium-containing surfaces is particularly challenging mainly owing to their particular surface anchoring chemistry. Also, when used in decorative items, the maintaining of the optics and/or haptics of the protective surface treated surface is particularly challenging for chromium surfaces, in particular rough chromium surfaces as encountered in automotive interiors or other decorative appliances.

A partial solution is described in WO 2007077136 (Schottner), which discloses a protective coating composition comprising a triazine ring containing silane resin allegedly providing a unique combination of properties. Another partial solution is described in US 2008/0314287A1 (Clark et al.), which describes fluorochemical urethane compounds and coating compositions derived thereof, which may be used in treating substrates, in particular hard surfaces such as ceramics or glass, to render them hydrophilic, oleophobic and easy to clean.

Other non-metal hard surfaces, in particular glass substrates, are also particularly sensitive to contamination, in particular inorganic and oily contamination. Cleaning and protective compositions for hard surfaces, including siliceous surfaces, are described e.g. in WO 2005/100521 (Evers et al.) and in WO 2005/100520 (Evers et al.). The disclosed cleaning and protective coating compositions are typically liquid aqueous acidic compositions delivering limescale and soap scum benefits on hard surfaces. In contrast, protective coating compositions suitable for imparting easy-to-clean properties to a siliceous substrate, in particular suitable for reducing oily contamination from the siliceous substrate are not widely described in the art. Oily contaminants such as fingerprints, stains or marks originating from oily of fat components present on siliceous substrates, in particular transparent and shiny surfaces, not only detrimentally affect their aesthetic appearance, but may also attract additional dirt. The ability to remove or clean oily contamination from siliceous substrates is particularly challenging mainly owing to their particular surface anchoring chemistry.

Other partial solutions are described in WO 2015/142894 (Audenaert), WO 2017/053345 (Audenaert et al.), WO 2018/005317 (Schuell et al.) and in US 2007/0244250-A1 (Yoshikawa et al.). The disclosed compositions typically make use of fluorinated products (in particular, perfluoropolyether silanes), which are more and more challenged by environmental organizations, or comprise complex chemically reactive systems.

Without contesting the technical advantages associated with the protective coating compositions known in the art, there is still a need for a non-fluorinated protective coating composition providing excellent and durable easy-to-clean and contamination resistance properties to the treated hard surfaces.

DESCRIPTION OF FIGURE

FIG. 1 is schematic of a stain release scale used to rate visual staining.

SUMMARY

According to one aspect, the present disclosure relates to a protective coating composition for a hard surface, wherein the composition comprises an organic solvent and a polysiloxane having the general formula (I):

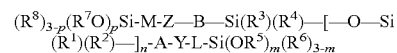

wherein:
R$^1$, R$^2$, R$^3$, R$^4$, R$^5$, R$^6$, R$^7$ and R$^8$ are independently an alkyl group having from 1 to 8 carbon atoms;
Y and Z are independently a divalent linking group selected from the group consisting of urea, urethane, oxygen atom, sulfur atom and alkylene having from 1 to 8 carbon atoms;

A, B, L and M are independently a divalent linking group selected from the group consisting of alkylene having from 1 to 8 carbon atoms, with the proviso that if the combined linking groups formed by -A-Y-L- and -M-Z—B— are independently an alkylene, then the alkylene is independently different from ethylene;

n is an integer from 5 to 1500; and m and p are independently an integer from 1 to 3.

In another aspect, the present disclosure is directed to a method of reducing contamination from a hard surface, which comprises the steps of:
a) providing a hard surface;
b) applying a protective coating composition as described above to the hard surface thereby forming a layer of the protective coating composition adjacent to the hard surface; and
c) drying and/or curing the layer of the protective coating composition thereby forming a protective coating layer adjacent to the hard surface.

According to still another aspect, the present disclosure is directed to a coated article comprising a substrate having a hard surface and a coating layer adjacent to at least part of the hard surface, wherein the coating layer comprises a layer of the protective coating composition as described above which has been dried and/or cured onto the hard surface.

In yet another aspect, the present disclosure relates to the use of a protective coating composition as described above for imparting any of easy-to-clean properties, contamination removal properties or contamination resistance properties to a hard surface.

DETAILED DESCRIPTION

According to one aspect, the present disclosure relates to a protective coating composition for a hard surface, wherein the composition comprises an organic solvent and a polysiloxane having the general formula (I):

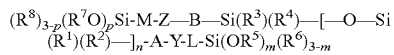
(R$^1$)(R$^2$)—]$_n$-A-Y-L-Si(OR$^5$)$_m$(R$^6$)$_{3-m}$ wherein:
R$^1$, R$^2$, R$^3$, R$^4$, R$^5$, R$^6$, R$^7$ and R$^8$ are independently an alkyl group having from 1 to 8 carbon atoms;
Y and Z are independently a divalent linking group selected from the group consisting of urea, urethane, oxygen atom, sulfur atom and alkylene having from 1 to 8 carbon atoms;
A, B, L and M are independently a divalent linking group selected from the group consisting of alkylene having from 1 to 8 carbon atoms, with the proviso that if the combined linking groups formed by -A-Y-L- and -M-Z—B— are independently an alkylene, then the alkylene is independently different from ethylene;
n is an integer from 5 to 1500; and
m and p are independently an integer from 1 to 3.

In the context of the present disclosure, it has been surprisingly found that a coating composition as described above provides excellent easy-to-clean and contamination resistance properties when used to treat a hard surface, in particular metal surfaces, as well as siliceous substrates.

Without wishing to be bound by theory, it is believed that these excellent easy-to-clean and contamination resistance properties are due to the specific type of polysiloxane as described above, and in particular to the specific combination of the polydialkylsiloxane moiety, the various divalent linking groups as described above, and the alkoxysilane end-capping groups. The presence of the organic solvent is also believed to play a crucial role in achieving these beneficial properties.

The coating compositions of the present disclosure are outstandingly suitable for reducing or removing oily contamination from a hard surface, in particular with simple wiping. As such, the coating compositions of the disclosure provide, in particular, outstanding fingerprint removal properties to the treated surfaces.

In some advantageous aspects, the protective coating compositions as described above are able to provide protective coatings provided with excellent durability, in particular wet mechanical abrasion resistance.

In some beneficial aspects, the protective coatings as described herein are nanometer-thin (nanoscale coating) and optically clear, which allows maintaining the optics and/or haptics of the to-be-treated hard surface. The specific combination of thin coating and excellent durability is unexpected, as generally high durability goes hand-in-hand with thick protective coatings.

The protective coating compositions of the present disclosure are based on conventional organic solvents, which beneficially do not require the use of fluorinated (co)solvents. In the context of the present disclosure, the technical challenge of formulating a simple and non-fluorinated protective coating composition has been overcome thanks to the use of the specific polysiloxane as described above From an application process perspective, the protective coating compositions as described herein are easy to apply according to cost-effective coating processes. Advantageously still, the protective coating compositions of the present disclosure do not require high temperature or actinic radiations-based curing steps, as the curing step is typically performed at temperatures below 150° C., or even below 130° C.

The protective coating compositions of the present disclosure are particularly suited for imparting "easy-to-clean" or "easy removal" properties to a hard surface, in particular cleaning or removal with dry- or wet-wiping. Advantageously, the protective coating compositions as described herein allow reducing or removing oily contamination without the need for aggressive scrubbing typically performed with chemical cleaners or detergents, which usually detrimentally affect the visual and aesthetic appearance of the treated surface. As such, the protective coating compositions of the present disclosure meet the highly desirable combination of dry- or wet-removal of contaminants (in particular oily contaminants) and non-fluorinated coating compositions.

The protective coating compositions as described herein are also characterized by the following advantageous properties, including: environmental friendliness of the materials used, excellent stability of the coating composition, excellent shelf-life, easy manufacturing and handling, ease of use by a relatively unskilled user, excellent coatability, outstanding optical properties (in particular transparency, homogeneity, streak-free appearance), and excellent durability, in particular wet and dry mechanical abrasion resistance.

The coating compositions of the present disclosure may find utility as protective coating for various metallic and non-metallic hard surfaces (in particular metal surfaces and glass substrates) encountered in a large variety of articles including those present in home or commercial kitchens (e.g., refrigerator, dishwasher, stove, oven, microwave, exhaust hoods, fryers, grease traps, food-preparation tables, cabinets, toasters), in decorative household appliances and lighting, in restrooms (e.g., toilet roll dispensers, toilet stall partitions, urinal partitions), in bathrooms, in automotive vehicles (exterior or interior car or motorcycle parts, such as e.g. alloy wheels, body parts, decorative or functional metallic panels, tanks, handlebars, wheel guards, mirror caps) or other transportation vehicles (e.g. trains or airplanes) with respective functional and decorative interior, glassware, buildings, or in consumer electronics (metal cases for mobile phones, tablets, and computers).

In the context of the present disclosure, the expression "chromium surface" is meant to designate a metallic surface having a chromium content of at least 50 wt %, based on the weight of the metallic surface.

The term "alkyl" means a linear or branched, cyclic or acyclic, saturated monovalent hydrocarbon. The term "alkylene" means a linear saturated divalent hydrocarbon or a branched saturated divalent hydrocarbon. The term "alkoxy" means an alkyl having a terminal oxygen atom.

The protective coating composition of the present disclosure comprises, as a first technical feature, a polysiloxane having the general formula (I):

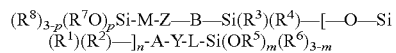

wherein:
R$^1$, R$^2$, R$^3$, R$^4$, R$^5$, R$^6$, R$^7$ and R$^8$ are independently an alkyl group having from 1 to 8 carbon atoms;
Y and Z are independently a divalent linking group selected from the group consisting of urea, urethane, oxygen atom, sulfur atom and alkylene having from 1 to 8 carbon atoms;
A, B, L and M are independently a divalent linking group selected from the group consisting of alkylene having from 1 to 8 carbon atoms, with the proviso that if the combined linking groups formed by -A-Y-L- and -M-Z—B— are independently an alkylene, then the alkylene is independently different from ethylene;
n is an integer from 5 to 1500; and
m and p are independently an integer from 1 to 3.

Suitable radicals R$^1$, R$^2$, R$^3$, R$^4$, R$^5$, R$^6$, R$^7$ and R$^8$ for use herein will be easily identified by those skilled in the art, in the light of the present description.

In a particular aspect of the present disclosure, the radicals R$^1$, R$^2$, R$^3$, R$^4$, R$^5$, R$^6$, R$^7$ and R$^8$ for use herein are independently an alkyl group having from 1 to 6 carbon atoms, from 1 to 4 carbon atoms, or even from 1 to 2 carbon atoms.

According to one advantageous aspect, the radicals R$^1$, R$^2$, R$^3$, R$^4$, R$^5$, R$^6$, R$^7$ and R$^8$ for use herein are independently selected from the group of methyl and ethyl. More advantageously, the radicals R$^1$, R$^2$, R$^3$, R$^4$, R$^5$, R$^6$, R$^7$ and R$^8$ for use herein are selected to be methyl.

According to a beneficial aspect of the present disclosure, divalent linking groups Y and Z for use herein are independently selected from the group consisting of urea, urethane, oxygen atom, sulfur atom, and alkylene having from 1 to 6 carbon atoms.

In the particular aspect where Y and Z are independently selected from the group of alkylenes, the alkylene has in particular from 1 to 4 carbon atoms, from 1 to 3 carbon atoms, or even from 1 to 2 carbon atoms.

According to a preferred aspect of the present disclosure, Y and Z are independently a divalent linking group selected from the group consisting of urea, urethane, and sulfur atom.

According to a particularly preferred aspect of the present disclosure, Y and Z are independently a divalent linking group selected to be urea.

In another particular aspect, divalent linking groups A, B, L and M for use herein are independently selected from the group consisting of alkylene having from 1 to 6 carbon atoms, from 1 to 4 carbon atoms, or even from 2 to 4 carbon atoms.

According to a preferred aspect of the present disclosure, divalent linking groups A, B, L and M for use herein are independently selected to be propylene.

According to a particularly preferred aspect of the present disclosure, the polysiloxane for use herein has one of the following formula:

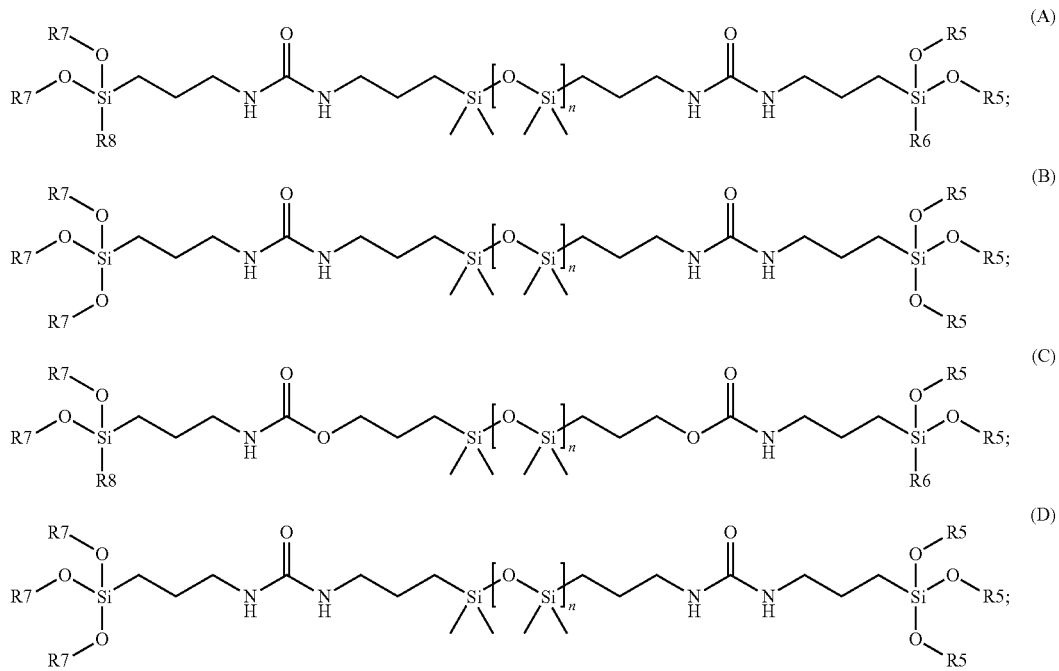

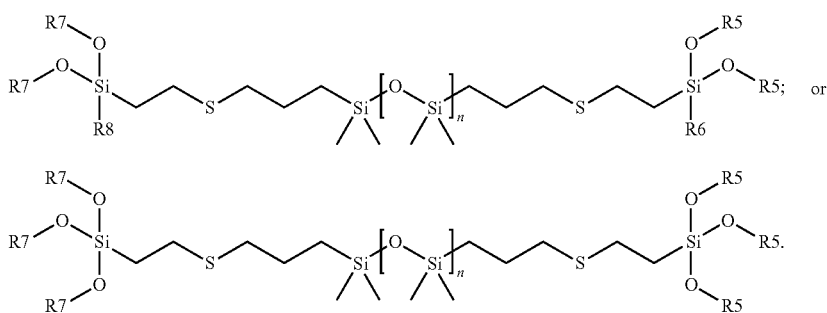

In one exemplary aspect of the disclosure, radical n is an integer from 5 to 1000, from 5 to 500, or even from 5 to 100.

According to one specific aspect of the polysiloxane for use herein, the silane group [—Si(OR$^5$)$_m$(R$^6$)$_{3-m}$] is covalently bonded to any of divalent linking groups A, Y or L as a side-chain or pendant group. In a particular aspect, the silane group [—Si(OR$^5$)$_m$(R$^6$)$_{3-m}$] is covalently bonded to any of divalent linking groups A or L.

According to another specific aspect of the polysiloxane for use herein, the silane group [(R$^8$)$_{3-p}$(R$^7$O)$_p$Si—] is covalently bonded to any of divalent linking groups M, Z or B as a side-chain or pendant group. In a particular aspect, the silane group [(R$^8$)$_{3-p}$(R$^7$O)$_p$Si—] is covalently bonded to any of divalent linking groups B or M.

In a beneficial aspect of the present disclosure, the polysiloxane for use herein has a number average molecular weight in the range from 500 to 200.000, from 500 to 150.000, from 500 to 100.000, from 1000 to 50.000, from 1500 to 30.000, from 1500 to 25.000, from 2000 to 20.000, or even from 2000 to 15.000. The molecular weight are measured in terms of Daltons and the number xxx.xxx can be written as xxx,xxx (such as 200.000 can be written as 200,000).

The number average molecular weight of the polysiloxane for use herein is typically determined using conventional methods for determining Functional Groups Equivalent Weight (FGEW), in particular titration, well known to those skilled in the art.

In a particularly advantageous aspect of the present disclosure, the polysiloxane for use herein has a number average molecular weight greater than 1000, greater than 1500, greater than 2000, greater than 2500, or even greater than 3000.

In a typical aspect, the protective coating composition according to the present disclosure comprises a polysiloxane in an amount of at least 0.01 wt %, at least 0.05 wt %, at least 0.1 wt %, at least 0.3 wt %, at least 0.5 wt %, at least 0.8 wt %, at least 1 wt %, or even at least 1.5 wt %, based on the weight of the overall coating composition.

In another typical aspect, the protective coating composition according to the present disclosure comprises a polysiloxane in an amount of less than 15 wt %, less than 12 wt %, less than 10 wt %, less than 8 wt %, or even less than 6 wt %, based on the weight of the overall coating composition.

According to a preferred aspect, the protective coating composition according to the present disclosure comprises a polysiloxane in an amount ranging from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt %, based on the weight of the overall coating composition.

The polysiloxane for use herein may generally be prepared according to any conventional method, well known to those skilled in the art. As a way of example, the polysiloxane may be prepared by chemically reacting an organofunctional polydialkylsiloxane, in particular a di-organofunctional polydialkylsiloxane, comprising at least one reactive organofunctional group (C), in particular two organofunctional groups (C), with one or more organofunctional silanes comprising at least one reactive organofunctional group (D), wherein the reactive organofunctional groups (C) and (D) are chemically reactive with each other. Exemplary reactive organofunctional groups (C) and (D) include, but are not limited to, amine, hydroxyl, thiol, isocyanate, epoxy, vinyl, anhydride and acrylic groups. In some particular aspects, the reaction of forming the polysiloxane for use herein may be carried out in one or more organic solvents.

The protective coating composition of the present disclosure comprises, besides the polysiloxane as described above, an organic solvent. Organic solvents for use herein are not particularly limited. Any organic solvents commonly known in the art may be used in the context of the present disclosure. Suitable organic solvents for use herein will be easily identified by those skilled in the art, in the light of the present disclosure. Advantageously, the organic solvent may be beneficially chosen such that it does not comprise any functional group which may unwantedly react with any of the reagents used for manufacturing the polysiloxane for use in the protective coating composition according to the disclosure.

According to one advantageous aspect of the present disclosure, the organic solvent for use herein is selected from the group of alcohols, in particular from the group consisting of ethanol, n-propanol, isopropanol, n-butanol, and any combinations thereof. More advantageously, the organic solvent for use herein comprises isopropanol.

According to another advantageous aspect of the present disclosure, the organic solvent for use herein is selected from the group of water-miscible solvents, in particular from the group of water-soluble ethers, more in particular from the group consisting of glycol ethers.

In one preferred execution of the present disclosure, the organic solvent for use herein is selected from the group consisting of propylene glycol n-butyl ether (PNB), dipropyleneglycol monomethylether (DPM), 2-butoxy ethanol, diethylene glycol dimethylether (Diglyme), and any combinations or mixtures thereof.

In one particularly advantageous aspect, the organic solvent for use herein comprises propylene glycol n-butyl ether (PNB).

According to an alternative aspect, the organic solvent for use herein is selected from the group of higher alkane content hydrocarbon solvents, in particular isoparaffins.

In a typical aspect, the protective coating composition according to the present disclosure comprises an organic solvent, in an amount greater than 50 wt %, greater than 60 wt %, greater than 70 wt %, greater than 80 wt %, greater than 85 wt %, greater than 90 wt %, or even greater than 98 wt %, based on the weight of the overall coating composition.

In another typical aspect, the protective coating composition according to the present disclosure comprises an organic solvent, in an amount ranging from 50 to 99.9 wt %, from 60 to 99 wt %, from 70 to 98 wt %, from 80 to 98 wt %, from 85 to 98 wt %, or even from 90 to 98 wt %, based on the weight of the overall coating composition.

The protective coating composition of the present disclosure may further comprise, as an optional ingredient, an amino-functional silane. Amino-functional silanes for use herein are not particularly limited. Any amino-functional silanes commonly known in the art may be theoretically used in the context of the present disclosure. Suitable amino-functional silanes for use herein will be easily identified by those skilled in the art, in the light of the present description. Exemplary amino-functional silanes for use herein are described in WO 2015/142894 (Audenaert), the content of which is herewith fully incorporated by reference.

In the context of the present disclosure, it has been surprisingly discovered that protective coating compositions comprising an amino-functional silane are provided with improved durability, in particular against wet mechanical abrasion, when compared to similar coating compositions not comprising an amino-functional silane. Without wishing to be bound by theory, it is believed that the amino-functional silane present in the coating composition promote adhesion of the protective coating composition to the hard surface by providing beneficial surface modification. It is further believed that the presence of the amino-functional silane directly in the coating composition may promote advantageous crosslinking within the resulting protective coating and lead to the forming of a more densely packed protective coating onto the hard surface.

Surprisingly still, it has been discovered that the incorporation of the amino-functional silane in the protective coating composition does not detrimentally affect the stability and the surface wetting properties of the resulting composition, which enables forming homogeneous coatings. Moreover, it has been unexpectedly found that the presence of the amino-functional silane directly in the protective coating composition of the disclosure, renders unnecessary the use of an additional and separate primer or adhesion promoter composition, which would typically require an additional processing step.

According to one advantageous aspect of the present disclosure, the amino-functional silane for use herein is selected from the group of secondary or tertiary amino-functional silanes.

According to a preferred aspect, the amino-functional silane for use in the protective coating composition of the disclosure, is selected from the group of bipodal aminosilanes.

According to another preferred aspect of the present disclosure, the amino-functional silane for use herein has the following general formula (II):

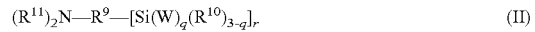

wherein:
R$^9$ is a multivalent alkylene group optionally interrupted by one or more —O— groups or up to three —NR$^3$— groups;
R$^{10}$ is alkyl or arylalkylenyl;
each R$^{11}$ is independently hydrogen, alkyl, arylalkylenyl, or —R$^9$—[Si(W)$_q$(R$^{10}$)$_{3-q}$];
W is alkoxy, acyloxy, aryloxy, polyalkyleneoxy, halogen, or hydroxyl;
q is 1, 2 or 3;
r is 1, 2 or 3;
with the provisos that at least two independently selected Si(W)$_q$(R$^{10}$)$_{3-q}$ groups are present and that both R$^{11}$ groups are not hydrogen.

In one advantageous aspect, one radical R$^{11}$ in general formula (II) is alkyl or hydrogen, and the other R$^{11}$ is —R$^9$—[Si(W)$_q$(R$^{10}$)$_{3-q}$].

According to a particularly preferred aspect, the amino-functional silane for use in the protective coating composition of the disclosure, has the following general formula (III):

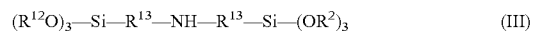

wherein:
R$^{12}$ is an alkyl group having from 1 to 8 carbon atoms, from 1 to 6 carbons, or even from 1 to 4 carbons;
R$^{13}$ is a divalent linking group selected from the group consisting of alkylenes having from 2 to 8 carbon atoms, from 2 to 6 carbon atoms, or even from 2 to 4 carbon atoms.

In one advantageous aspect of the amino-functional silane according to general formula (III), R$^{12}$ is selected from the group consisting of methyl, ethyl and propyl, preferably methyl; and R$^{13}$ is selected from the group consisting of propylene, butylene and pentylene, preferably propylene.

According to a particularly preferred aspect, the amino-functional silane for use herein is selected from the group of secondary or tertiary amino-functional silanes, preferably from the group consisting of bis(3-trimethoxysilyl propyl)amine, bis(3-triethoxysilyl propyl)amine, N-methyl-bis(3-trimethoxysilylpropyl)amine, N-methyl-bis(3-triethoxysilylpropyl)amine, N,N'-methyl-bis[3-trimethoxysilylpropyl]-ethylenediamine, N,N'-methyl-bis[3-triethoxysilylpropyl]-ethylenediamine, and any mixtures thereof.

In a very preferred aspect of the disclosure, the amino-functional silane for use herein is selected to be bis(3-trimethoxysilyl propyl)amine.

According to one typical aspect, the protective coating composition according to the present disclosure may comprise an amino-functional silane, in particular a bipodal aminosilane, in an amount of at least 0.01 wt %, at least 0.05 wt %, at least 0.1 wt %, at least 0.3 wt %, at least 0.5 wt %, at least 0.8 wt %, at least 1 wt %, or even at least 1.5 wt %, based on the weight of the overall coating composition.

According to another typical aspect of the disclosure, the coating composition comprises an amino-functional silane, in particular a bipodal aminosilane, in an amount of less than 15 wt %, less than 12 wt %, less than 10 wt %, less than 8 wt %, or even less than 6 wt %, based on the weight of the overall coating composition.

In an advantageous aspect, the coating composition comprises an amino-functional silane, in particular a bipodal aminosilane, in an amount ranging from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt %, based on the weight of the overall coating composition.

According to a preferred execution, the protective coating composition of the present disclosure comprises:
a) from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt % of the polysiloxane;
b) optionally, from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt % of the amino-functional silane, in particular a bipodal aminosilane; and
c) from 50 to 99 wt %, from 60 to 99 wt %, from 70 to 98 wt %, from 80 to 98 wt %, from 85 to 98 wt %, or even from 88 to 96 wt % of an organic solvent;
based on the weight of the overall coating composition.

According to an exemplary aspect, the protective coating composition according to the present disclosure has a concentration (solid content) of active agents (polysiloxane/amino-functional silane) of less than 30 wt %, less than 25 wt %, less than 20 wt %, less than 15 wt %, less than 10 wt %, less than 5 wt %, or even less than 1 wt %, based on the weight of the overall coating composition.

In another typical aspect, the protective coating composition has a concentration of active agents ranging from 0.01 wt % to 30 wt %, from 0.05 wt % to 30 wt %, from 0.1 wt % to 25 wt %, from 0.5 wt % to 20 wt %, from 1 wt % to 20 wt %, from 2 wt % to 20 wt %, from 2 wt % to 15 wt %, or even from 2 wt % to 10 wt %, based on the weight of the overall coating composition.

The protective coating composition of the present disclosure may further comprise optional additives commonly known in the field. Suitable additives will be typically selected depending on the targeted application. Exemplary additives include, but are not limited to, surface-active compounds, corrosion inhibitors, preservatives, complexing agents, galvanization assistants, coating additives, coloring pigments, chelating agents, detergents, stabilizers, dispersants, enzymes, dyes or perfumes.

According to one advantageous aspect, the protective coating composition of the present disclosure is free of fluorinated compounds, in particular free of fluorinated silanes, more in particular free of polyfluoropolyether silanes, even more in particular free of perfluoropolyether (PFPE) silanes.

According to another advantageous aspect, the protective coating composition of the present disclosure is free of fluorinated solvents, in particular free of fluorinated organic solvents, more in particular free of hydrofluoroethers.

The protective coating composition according to the present disclosure may be obtained according to techniques commonly known in the art. In a typical aspect, the coating composition is obtained by simply mixing the various ingredients—including the polysiloxane, and optionally the amino-functional silane—into the solvent mixture, followed by gentle mixing until dissolution.

The protective coating compositions of the present disclosure may be in the form of a solution, emulsion, suspension, dispersion or aerosol, depending on the targeted application. According to a typical aspect, the coating composition is in the form of a solution or dispersion of a polysiloxane as described above.

The protective coating compositions may be designed in any suitable form, depending again on the intended application. In an exemplary aspect, the protective coating composition may be in a sprayable form, or alternatively, in a wipeable or dippable form.

The protective coating composition can be applied using any of a variety of liquid coating techniques (e.g., spraying, dipping, painting, etc.). It can be simply dried at room temperature to remove at least a portion of the water which may be formed from the condensation of alkoxysilane moieties or the organic solvent that is included. If desired, the coating composition can be heated, after coating, to a temperature above room temperature (typically between 50° C. and 150° C.) for improved performance through e.g. curing.

Hard surfaces for use herein are not particularly limited. In the context of the present disclosure, any hard surfaces present for example in articles or parts present in home or commercial kitchens, in decorative household appliances and lighting, in restrooms, in bathrooms, in automotive vehicles, glassware, buildings or in consumer electronics, may be used. Suitable hard surfaces for use herein will be easily identified by those skilled in the art, in the light of the present description. Exemplary hard surfaces for use herein include various metal surfaces and non-metal surfaces.

According to an exemplary aspect, the hard surface for use herein comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

According to another exemplary aspect, the hard surface for use herein is translucent or preferably transparent, and is preferably selected from the group consisting of glass surfaces, thermoplastic polymeric surfaces, organic polymeric substrates, ceramic surfaces, and any combinations thereof.

In one preferred aspect of the present disclosure, the hard surface for use herein comprises a material selected from the group consisting metal and glass, in particular metal.

In a particularly preferred aspect, the hard surface for use herein is selected from the group consisting of stainless steel, chromium, aluminum, and any combinations or mixtures thereof. More preferably, the hard surface for use herein is a metal surface selected from the group consisting of stainless steel, chromium, and any combinations or mixtures thereof.

As already mentioned, the term "chromium surface" is meant to designate a metallic surface having a chromium content of at least 50 wt %, based on the weight of the metallic surface. Suitable chromium surfaces for use herein will be easily identified by those skilled in the art, in the light of the present description.

Chromium surfaces for use herein may of course also be provided with a thin oxidic (such as $Cr_2O_3$ and CrO) or hydroxidic surface layer. Such layers, which are usually formed spontaneously on the chromium surfaces when exposed to the ambient conditions, are meant to be included in the term "chromium surface". Further, chromium oxides and chromium hydroxides which may be present in the chromium surface are also meant to be included in the term 'chromium content".

In a particular aspect of the disclosure, the chromium surface for use herein is a metallic surface having a chromium content of at least 50 wt %, at least 70 wt %, at least 80 wt %, at least 90 wt %, at least 95 wt %, or even at least 98 wt %, based on the weight of the metallic surface. In another particular aspect, the chromium surface for use herein consists essentially of chromium ("pure" chromium).

Chromium surfaces for use herein may advantageously refer to a metallic surface comprising a metallic alloy having a chromium content of at least 50 wt %, based on the weight of the metallic alloy. According to one particular aspect of the present disclosure, the chromium surface for use herein comprises a chromium containing alloy. Chromium containing alloys are commonly known to those skilled in the art. The type and amounts of alloying constituents is determined in accordance with the desired end application. Exemplary constituents of chromium alloys include, in particular Zn, Al, Pb, Si, Mg, Sn, Cu, Cd, Fe, Co, Ni, Mn, Zr or Ti.

A chromium surface may also refer to the surface of a structure or a part composed entirely of chromium or a chromium-containing metallic alloy having a chromium content of at least 50 wt %, based on the weight of the metallic alloy. Alternatively, a chromium surface may refer to the surface of a structure or a part coated or plated with pure chromium or with a chromium-containing metallic alloy having a chromium content of at least 50 wt %, based on the weight of the metallic alloy ("chromated or chrome-plated surfaces"). Structures or parts coated or plated with chromium or a chromium-containing metallic alloy may be composed of other materials, such as e.g. other metals or metal alloys, polymers or composites. According to one preferred aspect of the present disclosure, the chromium surface for use herein is a chromated surface.

According to an exemplary aspect, the chromium surface for use herein may be present on a chrome-plated part, in particular a part chrome-plated by a galvanization process, in particular electrolytical galvanization or hot-dip galvanization process. In a particular aspect, the chromium surface is present on a part composed of a polymeric or composite material. According to another exemplary aspect, the polymeric or composite material is selected from the group consisting of polyolefins (polypropylene, polyethylene, high density polyethylene, blends of polypropylene), polyamide 6 (PA6), acrylonitrile butadiene styrene (ABS), PC/ABS blends, Polycarbonate (PC), Polyvinyl chloride (PVC), polyamide (PA), PUR, TPE, POM, polystyrene, poly(methyl) methacrylate, clear coats for vehicles, composite materials like fiber reinforced plastics, and any combinations or mixtures thereof. In a particular aspect, the chromium surface for use herein is present on a chrome-plated part comprises or is composed of acrylonitrile butadiene styrene (ABS).

In another aspect, the present disclosure is directed to a method of manufacturing a coating composition as described above, which comprises the steps of:
a) providing a polydialkylsiloxane diamine or a polydialkylsiloxane diol, in particular an alpha, omega-polydialkylsiloxane diamine or an alpha, omega-polydialkylsiloxane diol;
b) providing an isocyanatoalkyl trialkoxysilane;
c) allowing the polydialkylsiloxane diamine or the a polydialkylsiloxane diol to (chemically) react with the isocyanatoalkyl trialkoxysilane, thereby forming a polysiloxane as described above;
d) optionally, providing an amino-functional silane, in particular a bipodal aminosilane, as described above;
e) adding the polysiloxane obtained in step c) and optionally the amino-functional silane, in particular the bipodal aminosilane to an organic solvent as described above, thereby obtaining a homogeneous solution.

In still another aspect, the present disclosure is directed to a method of manufacturing a coating composition as described above, which comprises the steps of:
a) providing a polydialkylsiloxane dithiol, in particular an alpha, omega-polydialkylsiloxane dithiol;
b) providing a vinyl trialkoxysilane;
c) allowing the polydialkylsiloxane dithiol to (chemically) react with the vinyl trialkoxysilane, thereby forming a polysiloxane as described above;
d) optionally, providing an amino-functional silane, in particular a bipodal aminosilane, as described above;
e) adding the polysiloxane obtained in step c) and optionally the silane coupling agent, in particular the bipodal aminosilane to an organic solvent as described above, thereby obtaining a homogeneous solution.

In yet another aspect, the present disclosure is directed to a method of treating a hard surface comprising the steps of:
a) providing a protective coating composition as described above;
b) applying the protective coating composition to the hard surface thereby forming a layer of the coating composition adjacent to the hard surface; and;
c) optionally, drying and/or curing the layer of the coating composition thereby forming a protective coating layer adjacent to the hard surface.

The step of applying the coating composition may be performed according to techniques commonly known in the art. Suitable application methods depend on the number, size and shape of the hard surface part to be treated, and are not particularly limited. Exemplary applications techniques include, but are not limited to, spraying, rolling, wiping or dipping. In a particular aspect, the step of applying the coating composition is performed by wiping or dipping.

The step of applying the coating composition may comprise a plurality of individual process steps, including pre-treatment steps, of the hard surface. For example, the hard surface may be cleaned with a suitable preparation before treatment or treated with a suitable physical surface treatment such as e.g. corona or plasma treatment. The hard surface may be appropriately washed after and between such pre-treatment steps.

After the step of applying the coating composition, the treated hard surface may be allowed to drip off to remove the excess of coating compositions. The excess coating composition and any resulting residues may alternatively be removed by means of a wipe, a squeegee or doctor blade. As an additional, but optional step, the layer of coating composition formed onto the hard surface after the application step may be subjected to a drying and/or curing step. The drying and/or curing may be performed according to techniques well known in the art. Suitable drying and/or curing may be performed at room temperature or at elevated temperature, typically at temperatures comprised between 20° C. and 210° C., in particular between 50° C. and 150° C. Conditions and temperatures for performing the drying and/or curing step may be appropriately chosen by the person skilled in the art. A typical drying and/or curing step may be performed e.g. in an appropriate oven.

According to a further aspect of the present disclosure, it is provided a method of reducing contamination from a hard surface, which comprises the steps of:
a) providing a hard surface;
b) applying a protective coating composition as described above to the hard surface thereby forming a layer of the protective coating composition adjacent to the hard surface; and c) drying and/or curing the layer of the protective coating composition thereby forming a protective coating layer adjacent to the hard surface.

In yet another aspect of the present disclosure, it is provided a method of imparting contamination removal properties to a hard surface, which comprises the steps of a) providing a hard surface;
b) applying a protective coating composition as described above to the hard surface thereby forming a layer of the protective coating composition adjacent to the hard surface; and
c) drying and/or curing the layer of the protective coating composition thereby forming a protective coating layer adjacent to the hard surface.

Contamination as referred to herein is not particularly limited. In the context of the present disclosure, any contamination commonly encountered on metallic surfaces present for example in articles or parts present in home or commercial kitchens, in decorative household appliances and lighting, in restrooms, in bathrooms, in automotive vehicles, or in consumer electronics, may be used.

Suitable contamination for use herein will be easily identified by those skilled in the art, in the light of the present description. Exemplary contamination for use herein include, but are not limited to, stains or marks originating from organic or mineral sources.

In an advantageous aspect, the contamination is selected from oily contamination. Exemplary oily contamination for use herein include, but are not limited to, stains originating from oily or fat components.

In a particular aspect of the coating composition according to the disclosure, the oily contamination takes the form of a stain originating from oily or fat components selected from group consisting of moisturizing creams, body protection creams, sun creams, facial creams, therapeutic creams, human body fat, edible fat, edible oil, food oil, and any combinations or mixtures thereof. According to a preferred aspect, the oily contamination takes the form of a fingerprint.

All particular and preferred aspects relating to, in particular, the polysiloxane, the optional amino-functional silane, the solvent, the hard surface and the contamination as described above in the context of the coating composition, are fully applicable to the description of the methods of the present disclosure, as described above.

According to an advantageous aspect of the present disclosure, the methods are meant for imparting easy-to-clean properties and/or contamination resistance to the hard surface.

According to another advantageous aspect of the methods of the present disclosure, the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

According to still another advantageous aspect of the methods of the present disclosure, the hard surface is translucent or preferably transparent, and is preferably selected from the group consisting of glass surfaces, thermoplastic polymeric surfaces, organic polymeric substrates, ceramic surfaces, and any combinations thereof.

In a preferred aspect of the methods of the present disclosure, the hard surface for use herein comprises a material selected from the group consisting metal and glass, in particular metal.

In a further preferred aspect of the methods, the metal surface is selected from the group consisting of stainless steel, chromium, aluminum, and any combinations or mixtures thereof.

According to still another advantageous aspect of the methods of the present disclosure, the metal surface is a metallic surface having a chromium content of at least 50 wt %, at least 70 wt %, at least 80 wt %, at least 90 wt %, at least 95 wt %, or even at least 98 wt %, based on the weight of the metallic surface. In another particular aspect, the chromium surface consists essentially of chromium. In still another particular aspect, the chromium surface comprises a chromium containing alloy. In yet another aspect, the chromium surface is a chromated surface, in particular a chrome plated substrate, more in particular a chrome plated polymeric or composite substrate.

In a particular aspect of the methods of the present disclosure, the contamination takes the form of an oily contamination, in particular a fingerprint. In particular, the oily contamination takes the form of a stain originating from oily of fat components selected from group consisting of moisturizing creams, body protection creams, sun creams, facial creams, therapeutic creams, human body fat, edible fat, edible oil, food oil, and any combinations or mixtures thereof.

According to an advantageous aspect of the methods of the present disclosure, the drying/curing step, in particular the curing step, is performed at temperatures comprised between 20° C. and 35° C., or even between 20° C. and 30° C.

In another typical aspect, the drying/curing step, in particular the curing step, is performed at temperatures typically comprised between 60° C. and 200° C., between 60° C. and 160° C., between 80° C. and 150° C. or even between 90° C. and 150° C.

According to an advantageous execution, the methods of the present disclosure are free of any step of pre-treating the hard surface, in particular pre-treatment steps aimed at achieving chemical or physical activation of the hard surface, before applying the protective coating composition.

According to still another aspect, the present disclosure is directed to a coated article comprising a substrate having a hard surface and a coating layer adjacent to at least part of the hard surface, wherein the coating layer comprises a layer of the protective coating composition as described above which has been dried and/or cured onto the hard surface.

According to an advantageous aspect of the coated article of the present disclosure, the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

According to another advantageous aspect of the coated article of the present disclosure, the hard surface is translucent or preferably transparent, and is preferably selected from the group consisting of glass surfaces, thermoplastic polymeric surfaces, organic polymeric substrates, ceramic surfaces, and any combinations thereof.

All particular and preferred aspects relating to in particular, the polysiloxane, the optional amino-functional silane, the solvent, the hard surface and the contamination as described above in the context of the coating composition and the methods, are fully applicable to the description of the coated article, as described above.

According to another advantageous aspect, the coated article of the present disclosure has a static water contact angle of more than 60°, more than 65°, more than 70°, more than 75°, more than 80°, more than 85°, more than 90°, more than 95°, or even more than 100°, or even more than 105°, when measured according to the static water contact angle measurement method described in the experimental section.

According to yet another advantageous aspect, the coated article of the present disclosure has a static water contact angle of more than 60°, more than 65°, more than 70°, more than 75°, more than 80°, more than 85°, more than 90°, or even more than 95°, after 4000 wet mechanical abrasion cycles when measured according to the wet abrasion Erichsen test method described in the experimental section.

According to still another aspect, the present disclosure relates to the use of a protective coating composition as described above for protecting a hard surface.

In yet another aspect, the present disclosure relates to the use of a protective coating composition as described above for reducing contamination from a hard surface.

According to still another aspect, the present disclosure relates to the use of a protective coating composition as described above for imparting any of easy-to-clean properties, contamination removal properties or contamination resistance properties to a hard surface.

All particular and preferred aspects relating to the protective coating composition, the methods and the coated article as described above, are fully applicable to the description of the uses of the present disclosure, as described above.

Item 1 is a protective coating composition for a hard surface, wherein the composition comprises an organic solvent and a polysiloxane having the general formula (I):

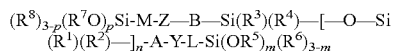

wherein:

$R^1$, $R^2$, $R^3$, $R^4$, $R^5$, $R^6$, $R^7$ and $R^8$ are independently an alkyl group having from 1 to 8 carbon atoms;

Y and Z are independently a divalent linking group selected from the group consisting of urea, urethane, oxygen atom, sulfur atom and alkylene having from 1 to 8 carbon atoms;

A, B, L and M are independently a divalent linking group selected from the group consisting of alkylene having from 1 to 8 carbon atoms, with the proviso that if the combined linking groups formed by -A-Y-L- and -M-Z—B— are independently an alkylene, then the alkylene is independently different from ethylene;

n is an integer from 5 to 1500; and m and p are independently an integer from 1 to 3.

Item 2 is a coating composition according to item 1, wherein $R^1$, $R^2$, $R^3$, $R^4$, $R^5$, $R^6$, $R^7$ and $R^8$ are independently an alkyl group having from 1 to 6 carbon atoms, from 1 to 4 carbon atoms, or even from 1 to 2 carbon atoms.

Item 3 is a coating composition according to any of item 1 or 2, wherein $R^1$, $R^2$, $R^3$, $R^4$, $R^5$, $R^6$, $R^7$ and $R^8$ are independently selected from the group of methyl and ethyl, in particular methyl.

Item 4 is a coating composition according to any of the preceding items, wherein Y and Z are independently a divalent linking group selected from the group consisting of urea, urethane, oxygen atom, sulfur atom, and alkylene having from 1 to 6 carbon atoms, from 1 to 4 carbon atoms, from 1 to 3 carbon atoms, or even from 1 to 2 carbon atoms.

Item 5 is a coating composition according to any of the preceding items, wherein Y and Z are independently a divalent linking group selected from the group consisting of urea, urethane, and sulfur atom.

Item 6 is a coating composition according to any of the preceding items, wherein Y and Z are independently a divalent linking group selected to be urea.

Item 7 is a coating composition according to any of the preceding items, wherein A, B, L and M are independently a divalent linking group selected from the group consisting of alkylene having from 1 to 6 carbon atoms, from 1 to 4 carbon atoms, or even from 2 to 4 carbon atoms.

Item 8 is a coating composition according to any of the preceding items, wherein A, B, L and M are independently a divalent linking group selected to be propylene.

Item 9 is a coating composition according to any of the preceding items, wherein the polysiloxane has one of the following formula:

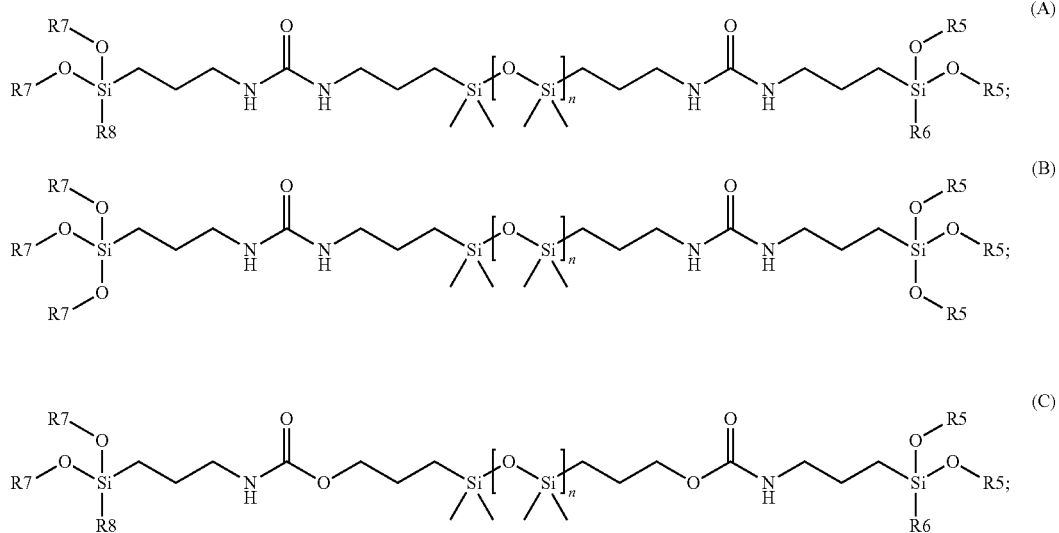

-continued

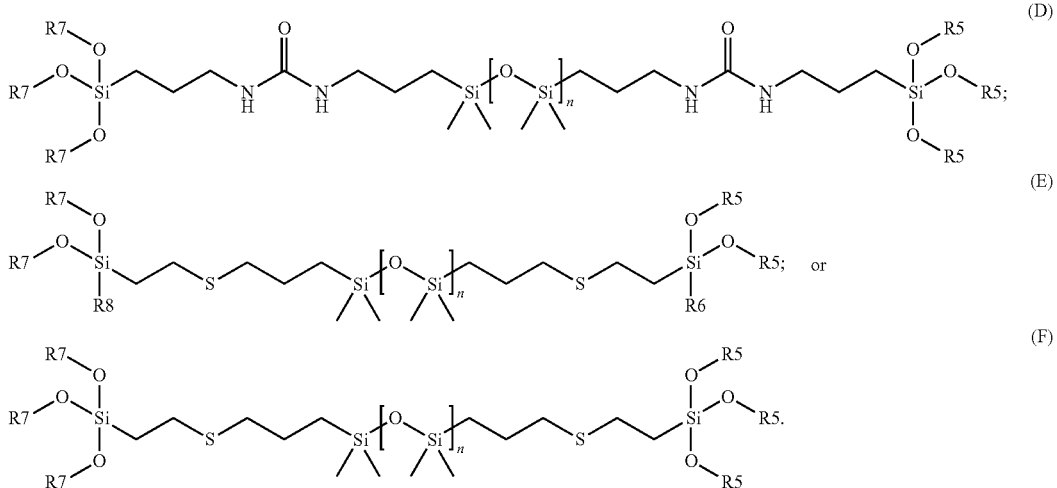

Item 10 is a coating composition according to any of the preceding items, wherein n is an integer from 5 to 1000, from 5 to 500, or even from 5 to 100.

Item 11 is a coating composition according to any of the preceding items, wherein the silane group [—Si(OR$^5$)$_m$(R$^6$)$_{3-m}$] is covalently bonded to any of divalent linking groups A, Y or L as a side-chain or pendant group.

Item 12 is a coating composition according to any of the preceding items, wherein the silane group [(R$^8$)$_{3-p}$(R$^7$O)$_p$Si—] is covalently bonded to any of divalent linking groups M, Z or B as a side-chain or pendant group.

Item 13 is a coating composition according to any of the preceding items, wherein the polysiloxane has a number average molecular weight in the range from 500 to 200.000, from 500 to 150.000, from 500 to 100.000, from 1000 to 50.000, from 1500 to 30.000, from 1500 to 25.000, from 2000 to 20.000, or even from 2000 to 15.000.

Item 14 is a coating composition according to any of the preceding items, wherein the polysiloxane has a number average molecular weight greater than 1000, greater than 1500, greater than 2000, greater than 2500, or even greater than 3000.

Item 15 is a coating composition according to any of the preceding items, wherein the organic solvent is selected from the group of alcohols, in particular from the group consisting of ethanol, n-propanol, isopropanol, n-butanol, and any combinations thereof.

Item 16 is a coating composition according to any of the preceding items, wherein the organic solvent comprises isopropanol.

Item 17 is a coating composition according to any of items 1 to 14, wherein the organic solvent is selected from the group of water-miscible solvents, in particular from the group of water-soluble ethers, more in particular from the group consisting of glycol ethers.

Item 18 is a coating composition according to item 17, wherein the organic solvent is selected from the group consisting of propylene glycol n-butyl ether (PNB), dipropyleneglycol monomethylether (DPM), 2-butoxy ethanol, diethylene glycol dimethylether (Diglyme), and any combinations or mixtures thereof.

Item 19 is a coating composition according to any of item 17 or 18, wherein the organic solvent comprises propylene glycol n-butyl ether (PNB).

Item 20 is a coating composition according to any of the preceding items, which comprises an organic solvent, in an amount greater than 50 wt %, greater than 60 wt %, greater than 70 wt %, greater than 80 wt %, greater than 85 wt %, greater than 90 wt %, or even greater than 98 wt %, based on the weight of the overall coating composition.

Item 21 is a coating composition according to any of the preceding items, which comprises an organic solvent, in an amount ranging from 50 to 99.9 wt %, from 60 to 99 wt %, from 70 to 98 wt %, from 80 to 98 wt %, from 85 to 98 wt %, or even from 90 to 98 wt %, based on the weight of the overall coating composition.

Item 22 is a coating composition according to any of the preceding items, which comprises a polysiloxane in an amount of at least 0.01 wt %, at least 0.05 wt %, at least 0.1 wt %, at least 0.3 wt %, at least 0.5 wt %, at least 0.8 wt %, at least 1 wt %, or even at least 1.5 wt %, based on the weight of the overall coating composition.

Item 23 is a coating composition according to any of the preceding items, which comprises a polysiloxane in an amount of less than 15 wt %, less than 12 wt %, less than 10 wt %, less than 8 wt %, or even less than 6 wt %, based on the weight of the overall coating composition.

Item 24 is a coating composition according to any of the preceding items, which comprises a polysiloxane in an amount ranging from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt %, based on the weight of the overall coating composition.

Item 25 is a coating composition according to any of the preceding items, which further comprises an amino-functional silane.

Item 26 is a coating composition according to item 25, wherein the amino-functional silane is selected from the group of secondary or tertiary amino-functional silanes, more preferably bipodal aminosilanes.

Item 27 is a coating composition according to item 26, wherein the amino-functional silane has the following general formula (II):

wherein:
R$^9$ is a multivalent alkylene group optionally interrupted by one or more —O— groups or up to three —NR$^3$— groups;

R$^{10}$ is alkyl or arylalkylenyl;
each R$^{11}$ is independently hydrogen, alkyl, arylalkylenyl, or —R$^9$—[Si(W)$_q$(R$^{10}$)$_{3-q}$];
W is alkoxy, acyloxy, aryloxy, polyalkyleneoxy, halogen, or hydroxyl;
q is 1, 2 or 3;
r is 1, 2 or 3;
with the provisos that at least two independently selected Si(W)$_q$(R$^{10}$)$_{3-q}$ groups are present and that both R$^{11}$ groups are not hydrogen.

Item 28 is a coating composition according to item 27, wherein one R$^{11}$ is alkyl or hydrogen, and the other R$^{11}$ is —R$^9$—[Si(W)$_q$(R$^{10}$)$_{3-q}$].

Item 29 is a coating composition according to any of items 25 to 28, wherein the amino-functional silane, in particular the bipodal aminosilane, has the following general formula (III):

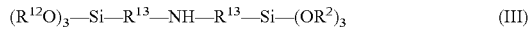
(R$^{12}$O)$_3$—Si—R$^{13}$—NH—R$^{13}$—Si—(OR$^2$)$_3$      (III)

wherein:
R$^{12}$ is an alkyl group having from 1 to 8 carbon atoms, from 1 to 6 carbons, or even from 1 to 4 carbons;
R$^{13}$ is a divalent linking group selected from the group consisting of alkylenes having from 2 to 8 carbon atoms, from 2 to 6 carbon atoms, or even from 2 to 4 carbon atoms.

Item 30 is a coating composition according to item 29, wherein R$^{12}$ is selected from the group consisting of methyl, ethyl and propyl, preferably methyl; and wherein R$^{13}$ is selected from the group consisting of propylene, butylene and pentylene, preferably propylene.

Item 31 is a coating composition according to any of items 25 to 30, wherein the amino-functional silane is selected from the group of secondary or tertiary amino-functional silanes, preferably from the group consisting of bis(3-trimethoxysilyl propyl)amine, bis(3-triethoxysilyl propyl)amine, N-methyl-bis(3-trimethoxysilylpropyl)amine, N-methyl-bis(3-triethoxysilylpropyl)amine, N,N'-methyl-bis[3-trimethoxysilylpropyl]-ethylenediamine, N,N'-methyl-bis[3-triethoxysilylpropyl]-ethylenediamine, and any mixtures thereof.

Item 32 is a coating composition according to any of items 25 to 31, wherein the amino-functional silane is selected to be bis(3-trimethoxysilyl propyl)amine.

Item 33 is a coating composition according to any of items 25 to 32, which comprises an amino-functional silane, in particular a bipodal aminosilane, in an amount of at least 0.01 wt %, at least 0.05 wt %, at least 0.1 wt %, at least 0.3 wt %, at least 0.5 wt %, at least 0.8 wt %, at least 1 wt %, or even at least 1.5 wt %, based on the weight of the overall coating composition.

Item 34 is a coating composition according to any of items 25 to 33, which comprises an amino-functional silane, in particular a bipodal aminosilane, in an amount of less than 15 wt %, less than 12 wt %, less than 10 wt %, less than 8 wt %, or even less than 6 wt %, based on the weight of the overall coating composition.

Item 35 is a coating composition according to any of the preceding items, which comprises an amino-functional silane, in particular a bipodal aminosilane, in an amount ranging from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt %, based on the weight of the overall coating composition.

Item 36 is a coating composition according to any of the preceding items, which comprises:
a) from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt % of the polysiloxane;
b) optionally, from 0.01 to 15 wt %, from 0.05 to 12 wt %, from 0.1 to 10 wt %, from 0.5 to 10 wt %, from 1 to 10 wt %, from 1 to 8 wt %, or even from 2 to 6 wt % of the amino-functional silane, in particular a bipodal aminosilane; and
c) from 50 to 99 wt %, from 60 to 99 wt %, from 70 to 98 wt %, from 80 to 98 wt %, from 85 to 98 wt %, or even from 88 to 96 wt % of an organic solvent;
based on the weight of the overall coating composition.

Item 37 is a coating composition according to any of the preceding items, which has a concentration (solid content) of active agents (polysiloxane/amino-functional silane) of less than 30 wt %, less than 25 wt %, less than 20 wt %, less than 15 wt %, less than 10 wt %, less than 5 wt %, or even less than 1 wt %, based on the weight of the overall coating composition.

Item 38 is a coating composition according to item 37, which has a concentration of active agents ranging from 0.01 wt % to 30 wt %, from 0.05 wt % to 30 wt %, from 0.1 wt % to 25 wt %, from 0.5 wt % to 20 wt %, from 1 wt % to 20 wt %, from 2 wt % to 20 wt %, from 2 wt % to 15 wt %, or even from 2 wt % to 10 wt %, based on the weight of the overall coating composition.

Item 39 is a coating composition according to any of the preceding items, which is free of fluorinated compounds, in particular free of fluorinated silanes, more in particular free of polyfluoropolyether silanes, even more in particular free of perfluoropolyether (PFPE) silanes.

Item 40 is a coating composition according to any of the preceding items, which is free of fluorinated solvents, in particular free of fluorinated organic solvents, more in particular free of hydrofluoroethers.

Item 41 is a coating composition according to any of the preceding items, wherein the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

Item 42 is a coating composition according to any of the preceding items, wherein the hard surface is translucent or preferably transparent, and is preferably selected from the group consisting of glass surfaces, thermoplastic polymeric surfaces, organic polymeric substrates, ceramic surfaces, and any combinations thereof.

Item 43 is a coating composition according to any of the preceding items, wherein the hard surface comprises a material selected from the group consisting metal and glass, in particular metal.

Item 44 is a coating composition according to any of the preceding items, wherein the metal surface is selected from the group consisting of stainless steel, chromium, aluminum, and any combinations or mixtures thereof.

Item 45 is a coating composition according to item 44, wherein the chromium surface is a metallic surface having a chromium content of at least 50 wt %, at least 70 wt %, at least 80 wt %, at least 90 wt %, at least 95 wt %, or even at least 98 wt %, based on the weight of the metallic surface.

Item 46 is a coating composition according to any of item 44 or 45, wherein the chromium surface consists essentially of chromium.

Item 47 is a coating composition according to any of item 44 or 46, wherein the chromium surface comprises a chromium containing alloy.

Item 48 is a coating composition according to any of item 44 or 46, wherein the chromium surface is a chromated surface.

Item 49 is a method of manufacturing a coating composition according to any of the preceding items, which comprises the steps of
   a) providing a polydialkylsiloxane diamine or a polydialkylsiloxane diol, in particular an alpha, omega-polydialkylsiloxane diamine or an alpha, omega-polydialkylsiloxane diol;
   b) providing an isocyanatoalkyl trialkoxysilane;
   c) allowing the polydialkylsiloxane diamine or the a polydialkylsiloxane diol to (chemically) react with the isocyanatoalkyl trialkoxysilane, thereby forming a polysiloxane as described in any of items 1 to 38;
   d) optionally, providing an amino-functional silane, in particular a bipodal aminosilane, as described in any of items 1 to 38;
   e) adding the polysiloxane obtained in step c) and optionally the amino-functional silane, in particular the bipodal aminosilane to an organic solvent as described in any of items 1 to 38, thereby obtaining a homogeneous solution.

Item 50 is a method of manufacturing a coating composition according to any of items 1 to 49, which comprises the steps of:
   a) providing a polydialkylsiloxane dithiol, in particular an alpha, omega-polydialkylsiloxane dithiol;
   b) providing a vinyl trialkoxysilane;
   c) allowing the polydialkylsiloxane dithiol to (chemically) react with the vinyl trialkoxysilane, thereby forming a polysiloxane as described in any of items 1 to 38;
   d) optionally, providing an amino-functional silane, in particular a bipodal aminosilane, as described in any of items 1 to 38;
   e) adding the polysiloxane obtained in step c) and optionally the silane coupling agent, in particular the bipodal aminosilane to an organic solvent as described in any of items 1 to 38, thereby obtaining a homogeneous solution.

Item 51 is a method of treating a hard surface comprising the steps of:
   a) providing a protective coating composition according to any of items 1 to 40;
   b) applying the protective coating composition to the hard surface thereby forming a layer of the coating composition adjacent to the hard surface; and;
   c) optionally, drying and/or curing the layer of the coating composition thereby forming a protective coating layer adjacent to the hard surface.

Item 52 is a method of reducing contamination from a hard surface, which comprises the steps of:
   a) providing a hard surface;
   b) applying a protective coating composition according to any of items 1 to 40 to the hard surface thereby forming a layer of the protective coating composition adjacent to the hard surface; and
   c) drying and/or curing the layer of the protective coating composition thereby forming a protective coating layer adjacent to the hard surface.

Item 53 is a method of imparting contamination removal properties to a hard surface, which comprises the steps of:
   a) providing a hard surface;
   b) applying a protective coating composition according to any of items 1 to 40 to the hard surface thereby forming a layer of the protective coating composition adjacent to the hard surface; and
   c) drying and/or curing the layer of the protective coating composition thereby forming a protective coating layer adjacent to the hard surface.

Item 54 is a method according to any of items 51 to 53, for imparting easy-to-clean properties and/or contamination resistance to the hard surface.

Item 55 is a method according to any of items 51 to 54, wherein the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

Item 56 is a method according to any of items 51 to 55, wherein the hard surface is translucent or preferably transparent, and is preferably selected from the group consisting of glass surfaces, thermoplastic polymeric surfaces, organic polymeric substrates, ceramic surfaces, and any combinations thereof.

Item 57 is a method according to any of items 51 to 56, wherein the hard surface comprises a material selected from the group consisting metal and glass, in particular metal.

Item 58 is a method according to item 57, wherein the metal surface is selected from the group consisting of stainless steel, chromium, aluminum, and any combinations or mixtures thereof.

Item 59 is a method according to item 58, wherein the chromium surface is a metallic surface having a chromium content of at least 50 wt %, at least 70 wt %, at least 80 wt %, at least 90 wt %, at least 95 wt %, or even at least 98 wt %, based on the weight of the metallic surface.

Item 60 is a method according to any of item 57 or 58, wherein the chromium surface consists essentially of chromium.

Item 61 is a method according to any of item 57 or 58, wherein the chromium surface comprises a chromium containing alloy.

Item 62 is a method according to any of item 57 or 58, wherein the chromium surface is a chromated surface.

Item 63 is a method according to any of items 53 to 62, wherein the contamination takes the form of an oily contamination, in particular a fingerprint.

Item 64 is a method according to item 63, wherein the oily contamination takes the form of a stain originating from oily or fat components selected from group consisting of moisturizing creams, body protection creams, sun creams, facial creams, therapeutic creams, human body fat, edible fat, edible oil, food oil, and any combinations or mixtures thereof.

Item 65 is a method according to any of items 52 to 64, wherein the drying/curing step, in particular the curing step, is performed at temperatures comprised between 20° C. and 35° C., or even between 20° C. and 30° C.

Item 66 is a method according to any of items 52 to 64, wherein the drying/curing step, in particular the curing step, is performed at temperatures typically comprised between 60° C. and 200° C., between 60° C. and 160° C., between 80° C. and 150° C. or even between 90° C. and 150° C.

Item 67 is a method according to any of items 52 to 66, which is free of any step of pre-treating the hard surface, in particular pre-treatment steps aimed at achieving chemical or physical activation of the hard surface, before applying the protective coating composition.

Item 68 is a coated article comprising a substrate having a hard surface and a coating layer adjacent to at least part of the hard surface, wherein the coating layer comprises a layer of the protective coating composition according to any of items 1 to 40 which has been dried and/or cured onto the hard surface.

Item 69 is a coated article according to item 68, wherein the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

Item 70 is a coated article according to any of item 68 or 69, wherein the hard surface is translucent or preferably transparent, and is preferably selected from the group consisting of glass surfaces, thermoplastic polymeric surfaces, organic polymeric substrates, ceramic surfaces, and any combinations thereof.

Item 71 is a coated article according to any of item 68 to 70, wherein the hard surface comprises a material selected from the group consisting metal and glass, in particular metal.

Item 72 is a coated article according to item 71, wherein the metal surface is selected from the group consisting of stainless steel, chromium, aluminum, and any combinations or mixtures thereof.

Item 73 is a coated article according to item 72, wherein the chromium surface is a metallic surface having a chromium content of at least 50 wt %, at least 70 wt %, at least 80 wt %, at least 90 wt %, at least 95 wt %, or even at least 98 wt %, based on the weight of the metallic surface.

Item 74 is a coated article according to any of item 72 or 73, wherein the chromium surface consists essentially of chromium.

Item 75 is a coated article according to any of item 72 or 73, wherein the chromium surface comprises a chromium containing alloy.

Item 76 is a coated article according to any of item 72 or 73, wherein the chromium surface is a chromated surface.

Item 77 is a coated article according to any of items 68 to 76, which has a static water contact angle of more than 60°, more than 65°, more than 70°, more than 75°, more than 80°, more than 85°, more than 90°, more than 95°, or even more than 100°, or even more than 105°, when measured according to the static water contact angle measurement method described in the experimental section.

Item 78 is a coated article according to any of items 68 to 77, which has a static water contact of more than 60°, more than 65°, more than 70°, more than 75°, more than 80°, more than 85°, more than 90°, or even more than 95°, after 4000 wet mechanical abrasion cycles when measured according to the wet abrasion Erichsen test method described in the experimental section.

Item 79 is the use of a protective coating composition according to any of items 1 to 40 for protecting a hard surface.

Item 80 is the use according to item 79, for reducing contamination from a hard surface.

Item 81 is the use according to any of item 79 or 80 for imparting any of easy-to-clean properties, contamination removal properties or contamination resistance properties to a hard surface.

Item 82 is the use according to any of items 79 to 81, wherein the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

Item 83 is the use according to any of items 79 to 82, wherein the hard surface is translucent or preferably transparent, and is preferably selected from the group consisting of glass surfaces, thermoplastic polymeric surfaces, organic polymeric substrates, ceramic surfaces, and any combinations thereof.

Item 84 is the use according to any of items 79 to 83, wherein the hard surface comprises a material selected from the group consisting metal and glass, in particular metal.

Item 85 is the use according to item 84, wherein the metal surface is selected from the group consisting of stainless steel, chromium, aluminum, and any combinations or mixtures thereof.

Item 86 is the use according to item 85, wherein the chromium surface is a metallic surface having a chromium content of at least 50 wt %, at least 70 wt %, at least 80 wt %, at least 90 wt %, at least 95 wt %, or even at least 98 wt %, based on the weight of the metallic surface.

Item 87 is the use according to any of item 85 or 86, wherein the chromium surface consists essentially of chromium.

Item 88 is the use according to any of item 87 or 88, wherein the chromium surface comprises a chromium containing alloy.

Item 89 is the use according to any of item 85 or 86, wherein the chromium surface is a chromated surface.

Examples

The present disclosure is further illustrated by the following examples. These examples are merely for illustrative purposes only and are not meant to be limiting on the scope of the appended claims.

Test Methods and Procedures:

Contact Angle Measurement

Static contact angle measurements are performed using Millipore water (WCA) with a Kruss DSA100 contact angle analyzer. Contact angle is measured on sessile drop (3 µL) and is measured 30 seconds after deposition. The values reported are the average of at least 4 (WCA) separate measurements.

Mechanical Wet Abrasion Testing (Erichsen Abrasion Testing)

Abrasion tests are performed on a Scrub Resistance Tester (commercially available from Erichsen GmbH, Germany) during 4000 cycles with no force applied. The cloth used for the abrasion cycles is the yellow side of a Scotchbrite™ sponge (commercially available from the 3M Company, USA) wetted with deionized water.

Stain Resistance (SR) Evaluation Test Method:

The stained test material is prepared by drawing a line being 30 mm long and having a 3 mm width onto the coated stainless steel test substrates, using a permanent marker (commercially available under tradename Artline 100N).

The marked test material is then dried for 45-60 minutes at room temperature, before carrying out the stain removal procedure. The stain removal is tested by rubbing for 20 seconds with a dry cotton cloth. After dry rubbing, the residual stains are visually rated according to the 8 point 3M Stain Release scale as depicted in FIG. 1, wherein: 1=completely stained, 8=no stain left.

Stain Removal (ST) Evaluation Test Method:

The ease of stain removal is assessed by visual observation the stain material (permanent marker) onto the stained coated test panel. The ease of the stain removal is evaluated on a scale ranging from 1 to 3, wherein: 1=very easy, 3=difficult.

Fingerprint (Oily Contamination) Removal (FR) and Marking (FM) Test Method

The fingerprint removal test method is performed according to a slightly modified version of test method BMW PR 506, as described below:

1.4 ml of an artificial finger fat (AFF) obtained by combining: 50 g of artificial alkaline sweat (according to DIN EN ISO 105-E04), 2 g of paraffin oil (commercially available from Sigma-Aldrich), 1.5 g Lecithin (Fluidlecithin Super, commercially available from Brennessel, Munich, Germany) and 0.3 g of PNC 400 thickener (polymer commercially available from Brennessel, Munich, Germany), is applied onto a 4 cm×4 cm "Glorex Bastelfilz weiß" felt piece (100% acrylic art. 6.1212.611, obtained from OBI, Germany) and spread with a wooden spatula. After 2 to 4 minutes a silicone rubber stamp—with a thumb profile—is pressed onto the felt piece with a force of 30 N for 5 seconds. Then, the silicone stamp is pressed onto the test chromium surface using a force of 30 N for 5 seconds. The samples are allowed to dry at room temperature for 24 hours before evaluation.

The removal of the fingerprint (FR) is performed by wiping the fingerprint-contaminated surface one time with a dry Kimwipe (dimension 0.3 cm×0.5 cm, available from Kimberly-Clark) using a force of ION, followed by wiping 40 times with a fresh dry Kimwipe using the same force. The fingerprint removal performance is determined on the as-deposited coating composition (no abrasion) by visual observation of the residual fingerprint after carrying the fingerprint removal process. The residual fingerprint is evaluated by using the following scale ranging from 1 to 5, wherein: 1=no fingerprint removal, 2=clear fingerprint residues, 3=light fingerprint residues, 4=minor fingerprint residues, 5=complete fingerprint removal, no visible residue.

The fingerprint marking (FM) is assessed by visual observation of the fingerprint material onto the stained coated test panel. The fingerprint marking is evaluated on a scale ranging from 5 to 10, wherein: 5=strong fingerprint marking, 6=clear fingerprint marking, 7=light fingerprint, 8=minimal fingerprint marking, 9-10=no change of the substrate.

Test Panels/Substrates Used for Testing:
- Stainless steel test substrates (Type 1.403 IIID) are available from Rocholl GmbH, Germany). The test panels have a dimension of 125 mm×75 mm×2 mm.
- Chrome plated ABS test substrates having high roughness (0.9 m, determined by confocal laser microscopy) are available from HSO GmbH (Solingen, Germany). The test panels have a dimension of 100 mm×50 mm×2 mm.
- Float glass panels available from Rocholl GmbH (Germany).

Materials Employed:

In the examples, the following raw materials are used:

BTMSPA is bis(trimethoxysilyl propyl)amine, which is a bipodal amino-silane, commercially available from Momentive.

Fluid NH15D is alpha, omega-polydimethylsiloxane diamine with a $M_n$ ranging from 1100 to 1600, commercially available from Wacker.

Fluid NH40D is alpha, omega-polydimethylsiloxane diamine with $M_n$ ranging from 2800 to 3300, commercially available from Wacker.

Fluid NH1300D is alpha, omega-polydimethylsiloxane diamine with $M_n$ ranging from 10000 to 12000, commercially available from Wacker.

IPTES is 3-isocyanatopropyl triethoxysilane, commercially available from Sigma-Aldrich.

IM 11 is alpha, omega-polydimethylsiloxane diol with a $M_w$ of about 1000, commercially available from Wacker.

IM 15 is alpha, omega-polydimethylsiloxane diol with a $M_w$ of about 4000, commercially available from Wacker.

KF-860 is a polydimethylsiloxane with alkylaminoalkylamine (—R—NH—R'—NH2) side chain groups with a Functional Group Equivalent Weight (FGEW) of 7600, commercially available from Shin-Etsu.

KF-865 is a polydimethylsiloxane with alkylamine (—R—NH2) side chain groups with a Functional Group Equivalent Weight (FGEW) of 5000, commercially available from Shin-Etsu.

VTMS is vinyl trimethoxy silane, commercially available from Sigma-Aldrich.

X-22-167C is a dual end mercapto silicone (EqW. Of about 1700), commercially available from Shin-Etsu.

Azo-initiator V-59 is commercially available from Wako Industries.

Isopropanol (IPA) is commercially available from Sigma-Aldrich.

Tertiary butanol (TBA) is commercially available from Sigma-Aldrich.

Propyleneglycol n-butyl ether (PNB), is a glycol ether, commercially available from Dow Chemicals, under trade designation Dowanol PnB.

Dipropylene glycol dimethyl ether is commercially available from Sigma-Aldrich.

Methyl ethyl ketone (MEK) is 2-butanone, commercially available from Sigma-Aldrich.

DBTDL is dibutyl tin dilaurate, commercially available from Sigma-Aldrich.

ECC-7000 is a comparative perfluoroether silane (10% solids) in fluorinated solvent Novec-7200, commercially available from 3M Company, USA.

Synthesis of the Polysiloxanes:

Synthesis of the Polydimethylsiloxane-Urea-Silane Polymer (PUS-1):

A dry 100 ml reactor is charged with 58.8 g of Fluid NH40D. Then, 9.88 g of IPTES is added slowly at room temperature while stirring. The reaction temperature rises to about 45° C. The reactor is sealed and run for 16 hours in a Launder-O-Meter® at 70° C. A semi-viscous clear liquid is obtained. The completion of the reaction is confirmed by FT—IR.

Synthesis of the Polydimethylsiloxane-Urea-Silane Polymer (PUS-2):

A dry 100 ml reactor is charged with 48.7 g of Fluid NH15D. Then, 22.23 g of IPTES is added slowly at room temperature while stirring. The reaction temperature rises to about 60° C. The reactor is sealed and run for 16 hours in a Launder-O-Meter® at 70° C. A semi-viscous clear liquid is obtained. The completion of the reaction is confirmed by FI—IR.

Synthesis of the Polydimethylsiloxane-Urea-Silane Polymer (PUS-3):

A dry 100 ml reactor is charged with 143.0 g of Fluid NH130D. Then, 6.42 g of IPTES is added slowly at room temperature while stirring. The reaction temperature rises to about 30° C. The reactor is sealed and run for 16 hours in a Launder-O-Meter® at 70° C. A viscous clear liquid is obtained. The completion of the reaction is confirmed by FI—IR.

For Most Applications this Product is First Diluted with PNB Solvent to Obtain a 25% Concentrate (PUS-3-25%).

Synthesis of the Polydimethylsiloxane-Urea-Silane Polymer (PUS-4):

A dry 100 ml reactor is charged with 22.50 g of KF-865 and 23.6 g dipropylene glycol dimethyl ether. Then 1.11 g of IPTES is added at room temperature while stirring. The reactor is sealed and run for 6 hours in a Launder-O-Meter® at 75° C. A non-viscous slightly yellow clear liquid is obtained. The completion of the reaction is confirmed by FI—IR.

Synthesis of the Polydimethylsiloxane-Urea-Silane Polymer (PUS-5):

A dry 100 ml reactor is charged with 22.80 g of KF-860 and 23.5 g t.butanol. Then 0.74 g of IPTES is added at room temperature while stirring. The reactor is sealed and run for 6 hours in a Launder-O-Meter® at 75° C. A yellow hazy liquid is obtained. The completion of the reaction is confirmed by FI—IR.

Synthesis of the Polydimethylsiloxane-Urethane-Silane Polymer (PUTS-1):

A dry 100 ml reactor is charged with 20.0 g of IM 11. Then, 9.88 g of IPTES is added slowly at room temperature while stirring, followed by 1 drop of DBTDL catalyst. The reaction temperature rises to about 40° C. The reactor is sealed and run for 5 hours in a Launder-O-Meter® at 75° C. A semi-viscous clear liquid is obtained. The completion of the reaction is confirmed by FI—IR.

Synthesis of the Polydimethylsiloxane-Urethane-Silane Polymer (PUTS-2):

A dry 100 ml reactor is charged with 26.0 g of IM 15. Then, 3.20 g of IPTES is added slowly at room temperature while stirring, followed by 1 drop of DBTDL catalyst. The reaction temperature rises to about 40° C. The reactor is sealed and run for 5 hours in a Launder-O-Meter® at 75° C. A semi-viscous clear liquid is obtained. The completion of the reaction is confirmed by FI—IR.

Synthesis of the Polydimethylsiloxane-Thio-Silane Polymer (PTS-1):

A dry 100 ml polymerization bottle is charged respectively with 19.55 g of X-22-167C, 1.89 g of VTMS, 21.44 g of TBA and 0.107 g of V-59 azo-initiator. The bottle is degassed with waterjet vacuum, followed by breaking the vacuum with nitrogen atmosphere. This procedure is repeated three times. The polymerization bottle is run for 16 hours in a preheated Launder-O-Meter® at 75° C. After cooling, 0.107 g of V-59 is added. The bottle is again degassed and covered with nitrogen atmosphere. The polymerization bottle is then run for another 8 hours at 75° C. A semi-viscous clear solution is obtained containing 50% polysiloxane-silane polymer solids.

Preparation of the Coating Compositions:

Unless otherwise stated, the coating compositions are prepared by adding the appropriate amount of the various components according to the following sequence. First, the solvent (PNB) is placed in a vial, followed by the addition of the polysiloxane and optionally, the silane coupling agent (BTMSPA) in the amount necessary to obtain the required concentration. The mixture is gently mixed to dissolve and immediately ready to be used as a homogeneous solution.

Typical coating formulations for spray application are prepared at a 50 g scale by mixing active ingredients and the PNB solvent in such a ratio that both the polysiloxanes (or comparative perfluoropolyether silane) and the optional BTMSPA are present at 0.2% solids (0.4% solids in total).

Typical coating formulations for dip coating are prepared at a 110 g scale by mixing active ingredients and the PNB solvent in such a ratio that both the polysiloxanes and the optional BTMSPA are present at 0.1% solids (0.2% solids in total).

Application and Curing Procedure:

Substrate Cleaning:

Prior to testing, the stainless-steel test panels are cleaned by wiping once with methyl ethyl ketone (MEK), once with n-heptane and again once with MEK, using a soaked fluff-free paper tissue (3M professional Panel Wipe 34567) and left to dry at 20° C. for 3 minutes.

Prior to testing, the chrome-plated ABS test panels are cleaned by wiping once with 2-propanol, using a soaked fluff-free paper tissue (3M professional Panel Wipe 34567) and left to dry at 20° C. for 3 minutes.

Prior to testing, the glass panels are cleaned by wiping respectively with glass cleaner and detergent Cif™ (commercially available from Unilever), followed by rinsing respectively with water and acetone. The applications are carried out on the air side of the glass panels.

Spray Application:

The coating formulations are sprayed with an air-atomizing spray gun available from Binks, USA (pressure: 2 bar, flow rate: 40 ml/min), followed by drying at 20° C. for 1 minute and oven (Heraeus, Germany) curing at 120° C. for 20 minutes. The so-treated samples are used for further testing 48 hours after coating and curing.

Dip-Coating:

The substrates are dip-coated using aRDC 21-K Dip Coater available from Bungard Elektronik GmbH (dipping speed: 300 mm/mmn, immersion time: 1 minute), followed by drying at 20° C. for 1 minute and oven (Heraeus, Germany) curing at 80° C. for 10 minutes. The so-treated samples are used for further testing 24 hours after coating and curing.

EXAMPLES

Examples 1 to 13 and Comparative Examples C1 to C3: Protective Coating Compositions The formulations used for the various coating compositions are described in Tables 1 and 2 below. Formulations C1 and C2 are comparative examples using a composition comprising a perfluoroether silane instead of a polysiloxane.

TABLE 1

| Ingredient (g) | ECC-7000 | PUS-1 | PUS-2 | PUS-3 (25%) | PUS-4 | BTMSPA | PNB | % solids |
|---|---|---|---|---|---|---|---|---|
| C1 | 1 | — | — | — | — | — | 49 | 0.2 |
| C2 | 1 | — | — | — | — | 2 | 47 | 0.4 |
| C3 | 0.4 | — | — | — | — | — | 39.6 | 0.1 |
| Ex. 1 | — | 2 | — | — | — | — | 48 | 0.2 |
| Ex. 2 | — | 2 | — | — | — | 2 | 46 | 0.4 |
| Ex. 3 | — | — | 2 | — | — | — | 48 | 0.2 |
| Ex. 4 | — | — | 2 | — | — | 2 | 46 | 0.4 |
| Ex. 5 | — | 1 | — | — | — | 1 | 48 | 0.2 |
| Ex. 6 | — | — | 1 | — | — | 1 | 48 | 0.2 |
| Ex. 7 | — | — | — | 0.32 | — | — | 39.68 | 0.2 |
| Ex. 8 | — | — | — | — | 0.2 | 2 | 47.8 | 0.4 |

TABLE 2

| Ingredient (g) | PUS-5 | PUTS-1 | PUTS-2 | PTS-1 | BTMSPA | PNB | % solids |
|---|---|---|---|---|---|---|---|
| Ex. 9 | 0.2 | — | — | — | 2 | 47.8 | 0.4 |
| Ex. 10 | — | 0.1 | — | — | 2 | 47.9 | 0.4 |
| Ex. 11 | — | — | 0.1 | — | — | 49.9 | 0.2 |
| Ex. 12 | — | — | 0.1 | — | 2 | 47.9 | 0.4 |
| Ex. 13 | — | — | — | 0.2 | 2 | 47.8 | 0.4 |

Examples 1 to 4, 8 to 13 and Comparative Examples C1 to C2

Anti-contamination properties and mechanical abrasion properties of protective coating compositions applied on stainless steel plates.

The coating formulations used in the examples are applied on the stainless plate by spray application according to the procedure described above. The data presented in Table 3 reflect the anti-contamination properties and the mechanical abrasion properties of the various coating compositions on stainless steel. The mechanical abrasion performance is measured according to the Erichsen abrasion testing.

TABLE 3

| | Coated | | After wet mechanical abrasion Erichsen (4000 cycles) | |
|---|---|---|---|---|
| Example | Stain Removal (ST) | Stain Resistance (SR) | Stain Removal (ST) | Stain Resistance (SR) |
| uncoated | 3 | 2 | 3 | 2 |
| C1 | 1 | 8 | 3 | 3 |
| C2 | 1 | 8 | 3 | 8 |
| 1 | 3 | 7 | 3 | 8 |
| 2 | 1 | 8 | 1 | 8 |
| 3 | 3 | 7 | 3 | 3 |
| 4 | 3 | 8 | 3 | 8 |
| 8 | 1 | 8 | 1 | 8 |
| 9 | 1 | 8 | 1 | 8 |
| 10 | 3 | 8 | 3 | 8 |
| 11 | 2 | 7 | 3 | 2 |
| 12 | 1 | 8 | 3 | 8 |
| 13 | 1 | 8 | 3 | 8 |

As shown in Table 3, the protective coating compositions according to the present disclosure have improved overall anti-contamination properties (ST and SR) and mechanical abrasion properties on stainless steel, when compared to uncoated substrates. Moreover, the results in Table 3 clearly reflects that the protective coating compositions according to the present disclosure have overall anti-contamination properties (ST and SR) and mechanical abrasion properties at least comparable to the comparative perfluoroether silane ECC-7000.

Examples 5 and 6

Anti-contamination properties of protective coating compositions applied on chrome-plated ABS test substrates.

The coating formulations used in the examples are applied on the chrome-plated ABS parts by dip application according to the procedure described above. The data presented in Table 4 reflect the anti-contamination properties of the various coating compositions.

TABLE 4

| Example | Stain Removal (ST) | Fingerprint Marking (FM) | Fingerprint removal (FR) |
|---|---|---|---|
| Uncoated | 7 | 5 | 6 |
| 5 | 8 | 6 | 9 |
| 6 | 7 | 6 | 8 |

As shown in Table 4, the protective coating compositions according to the present disclosure have improved overall anti-contamination properties (ST, FM an FR), when compared to uncoated substrates.

Example 7 and Comparative Example C3

Anti-contamination properties of protective coating compositions applied on glass (air side) substrates.

The coating formulations used in the examples are applied on glass panels by spray application according to the procedure described above. The data presented in Table 5 reflect the anti-contamination properties of the various coating compositions on glass substrates. The mechanical abrasion performance is measured according to the Erichsen abrasion testing.

TABLE 5

| Example | Coated Stain Removal (ST) | Coated Stain Resistance (SR) | After wet mechanical abrasion Erichsen (4000 cycles) Stain Removal (ST) | After wet mechanical abrasion Erichsen (4000 cycles) Stain Resistance (SR) |
|---|---|---|---|---|
| uncoated | 3 | 2 | 3 | 2 |
| C3 | 1 | 8 | 1 | 8 |
| 7 | 1 | 8 | 2 | 4 |

As shown in Table 5, the protective coating compositions according to the present disclosure have improved overall anti-contamination properties (ST and SR) and mechanical abrasion properties on glass substrates, when compared to uncoated substrates. Moreover, the results in Table 5 clearly reflects that the protective coating compositions according to the present disclosure have overall anti-contamination properties (ST and SR) and mechanical abrasion properties at least comparable to the comparative perfluoroether silane ECC-7000.

The invention claimed is:

1. A protective coating composition for a hard surface, wherein the protective coating composition comprises
    an organic solvent in an amount greater than 50 weight percent based on a total weight of the protective coating composition; and
    a polysiloxane having the general formula (I):

$$(R^8)_{3-p}(R^7O)_p\text{Si-M-Z—B—Si}(R^3)(R^4)\text{—[—O—Si}(R^1)(R^2)\text{—]}_n\text{-A-Y-L-Si(OR}^5)_m(R^6)_{3-m} \quad (I)$$

wherein:
   $R^1$, $R^2$, $R^3$, $R^4$, $R^5$, $R^6$, $R^7$ and $R^8$ are independently an alkyl group having from 1 to 8 carbon atoms;
   Y and Z are independently a divalent linking group selected from the group consisting of urea, urethane, oxygen atom, sulfur atom and alkylene having from 1 to 8 carbon atoms;
   A, B, L and M are independently a divalent linking group selected from the group consisting of alkylene having from 1 to 8 carbon atoms, with the proviso that if the combined linking groups formed by -A-Y-L-and-M-Z—B— are independently an alkylene, then the alkylene is independently different from ethylene;
   n is an integer from 5 to 1500; and
   m and p are independently an integer from 1 to 3.

2. The protective coating composition of claim 1, wherein $R^1$, $R^2$, $R^3$, $R^4$, $R^5$, $R^6$, $R^7$ and $R^8$ are independently an alkyl group having from 1 to 6 carbon atoms.

3. The protective coating composition of claim 1, wherein Y and Z are independently a divalent linking group selected from the group consisting of urea, urethane, and sulfur atom.

4. The protective coating composition of claim 1, wherein the polysiloxane has one of the following formula:

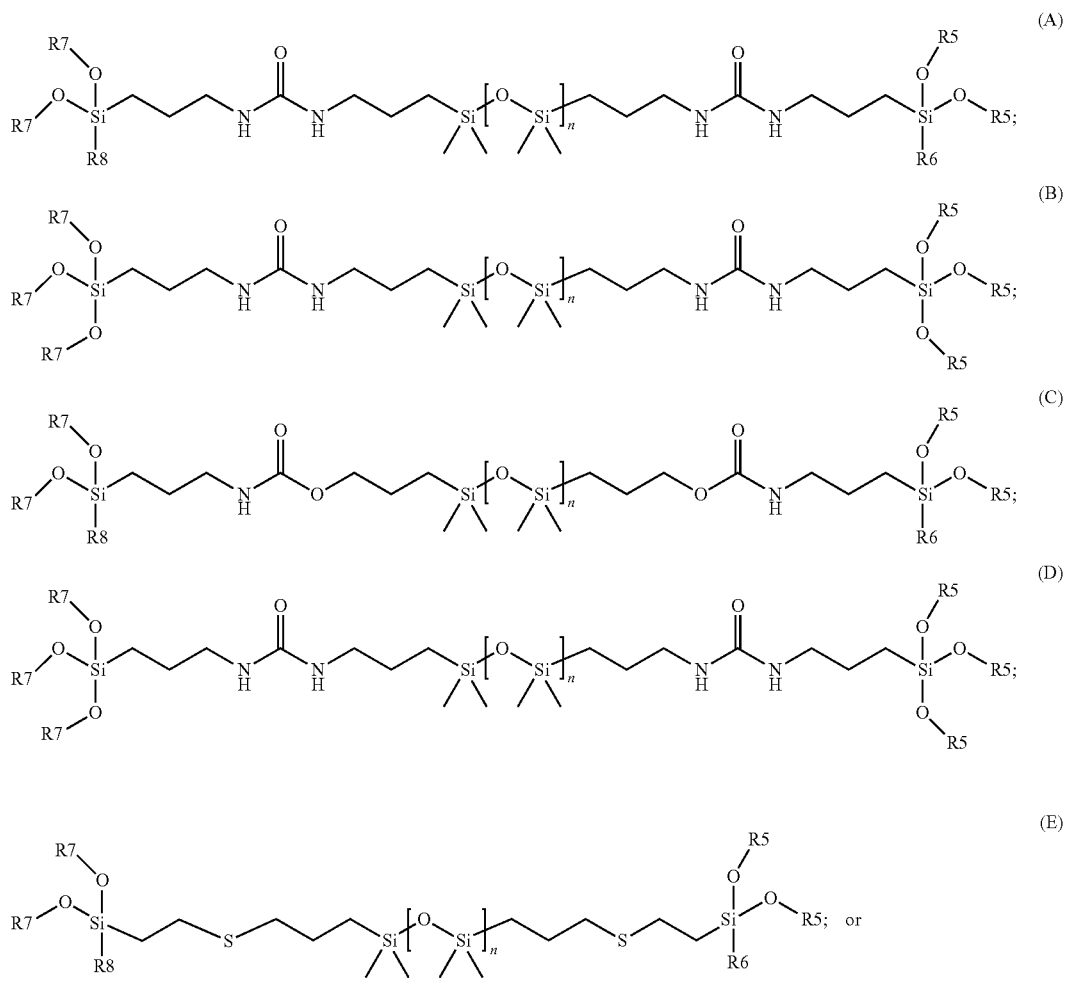

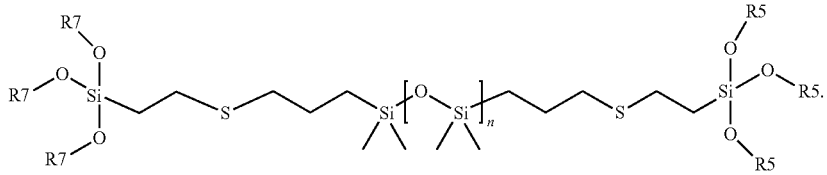
(F)

5. The protective coating composition of claim 1, wherein the polysiloxane has a number average molecular weight in the range from 500 to 200,000 Daltons.

6. The protective coating composition of claim 1, wherein the polysiloxane has a number average molecular weight greater than 1000 Daltons.

7. The protective coating composition of claim 1, which further comprises an amino-functional silane.

8. The protective coating composition of claim 7, wherein the amino-functional silane has the following general formula (II):

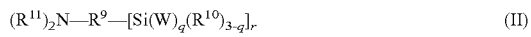

wherein:
R$^9$ is a multivalent alkylene group optionally interrupted by one or more —O— groups or up to three —NR$^3$— groups;
R$^{10}$ is alkyl or arylalkylenyl;
each R$^{11}$ is independently hydrogen, alkyl, arylalkylenyl, or —R$^9$—[Si(W)$_q$(R$^{10}$)$_{3-q}$];
W is alkoxy, acyloxy, aryloxy, polyalkyleneoxy, halogen, or hydroxyl;
q is 1, 2 or 3;
r is 1, 2 or 3;
with the provisos that at least two independently selected Si(W)$_q$(R$^{10}$)$_{3-q}$ groups are present and that both R$^{11}$ groups are not hydrogen.

9. The protective coating composition of claim 7, wherein the amino-functional silane is selected from the group consisting of bis(3-trimethoxysilyl propyl)amine, bis(3-triethoxysilyl propyl)amine, N-methyl-bis(3-trimethoxysilylpropyl)amine, N-methyl-bis(3-triethoxysilylpropyl)amine, N,N'-methyl-bis[3-trimethoxysilylpropyl]-ethylenediamine, N,N'-methyl-bis[3-triethoxysilylpropyl]-ethylenediamine, and any mixtures thereof.

10. The protective coating composition of claim 7 comprising an amino-functional silane in an amount ranging from 0.01 to 15 wt %, based on the weight of the protective coating composition.

11. The protective coating composition of claim 1 comprising:
a) from 0.01 to 15 wt % of the polysiloxane;
b) optionally, from 0.01 to 15 wt % of an amino-functional silane; and
c) from 50 to 99 wt % of an organic solvent;
based on the weight of the protective coating composition.

12. The protective coating composition of claim 1, wherein the hard surface comprises a material selected from the group consisting of siliceous substrates, glass surfaces, plastic surfaces, thermoset polymeric surfaces, thermoplastic polymeric surfaces, organic polymeric substrates, metal-coated polymeric surfaces, ceramic surfaces, cement surfaces, stone surfaces, painted or clearcoat surfaces, metal surfaces, wood, wood laminate, polyurethane-coated wood, and any combinations thereof.

13. A method of reducing contamination from a hard surface, which comprises the steps of:
a) providing a hard surface;
b) applying a protective coating composition of claim 1 to the hard surface thereby forming a layer of the protective coating composition adjacent to the hard surface; and
c) drying and/or curing the layer of the protective coating composition thereby forming a protective coating layer adjacent to the hard surface.

14. A coated article comprising a substrate having a hard surface and a coating layer adjacent to at least part of the hard surface, wherein the coating layer comprises a layer of the protective coating composition of claim 1 that has been dried and/or cured onto the hard surface.

* * * * *